(12) United States Patent
Tagawa et al.

(10) Patent No.: US 8,948,949 B2
(45) Date of Patent: Feb. 3, 2015

(54) DRIVE CONTROL APPARATUS FOR PROVIDING DRIVE CONTROL TO A HYBRID ELECTRIC VEHICLE, AND HYBRID ELECTRIC VEHICLE

(75) Inventors: Masaaki Tagawa, Shizuoka (JP); Yoshiki Ito, Shizuoka (JP); Masakazu Saito, Shizuoka (JP); Hitoshi Ohkuma, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 1 day.

(21) Appl. No.: 13/982,770

(22) PCT Filed: Feb. 9, 2011

(86) PCT No.: PCT/JP2011/000728
§ 371 (c)(1),
(2), (4) Date: Jul. 31, 2013

(87) PCT Pub. No.: WO2012/107958
PCT Pub. Date: Aug. 16, 2012

(65) Prior Publication Data
US 2013/0311025 A1 Nov. 21, 2013

(51) Int. Cl.
*B60W 20/00* (2006.01)
*B60W 30/184* (2012.01)
(Continued)

(52) U.S. Cl.
CPC ............. *B60W 20/00* (2013.01); *B60W 30/184* (2013.01); *B60K 6/445* (2013.01); *B60W 10/08* (2013.01);
(Continued)

(58) Field of Classification Search
CPC ..... B60W 20/00; B60W 30/184; B60K 6/445
USPC ........... 701/22; 477/4, 5; 180/65.235, 65.285; 903/903
See application file for complete search history.

(56) References Cited

U.S. PATENT DOCUMENTS 6,170,587 B1 * 1/2001 Bullock ..................... 180/69.6
7,086,977 B2 * 8/2006 Supina et al. ................. 475/5
(Continued)

FOREIGN PATENT DOCUMENTS

| JP | 2006-67665 A | 3/2006 |
| JP | 2007-131103 A | 5/2007 |
| JP | 2007-237885 A | 9/2007 |
| JP | 2008-12992 A | 1/2008 |
| JP | 2008-265599 A | 11/2008 |

OTHER PUBLICATIONS

International Search Report mailed May 17, 2011 in PCT/JP2011/000728.

*Primary Examiner* — Thomas G Black
*Assistant Examiner* — Wae Louie
(74) *Attorney, Agent, or Firm* — Rothwell, Figg, Ernst & Manbeck, P.C.

(57) ABSTRACT

A torque applied to a one-way clutch when a first motor generator and second motor generator are operated in a motor generator drive mode is restrained or prevented from becoming excessively high by setting a first motor generator sharing ratio in response to a driving torque target for the vehicle, by controlling operation of the first motor generator in response to a first motor generator first sharing ratio when vehicle vibrations due to cogging torque are likely to take place, and by reducing the torque from the first motor generator when the driving torque target is large. Torque applied to the one-way clutch which otherwise would become excessively high immediately after engine shutdown, is restrained or prevented by reducing the torque from the first motor generator in response to a second motor generator second sharing ratio when engine downtime is short.

6 Claims, 15 Drawing Sheets

(51) Int. Cl.
*B60K 6/445* (2007.10)
*B60W 10/08* (2006.01)
*B60W 30/186* (2012.01)
*B60W 30/188* (2012.01)
*B60W 30/20* (2006.01)

(52) U.S. Cl.
CPC .............. *B60W 20/40* (2013.01); *B60W 30/186* (2013.01); *B60W 30/188* (2013.01); *B60W 2030/206* (2013.01); *B60W 2710/083* (2013.01); *B60W 2710/105* (2013.01); *Y02T 10/6239* (2013.01); *Y10S 903/903* (2013.01)
USPC ................ 701/22; 477/4; 477/5; 180/65.235; 180/65.285; 903/903

(56) References Cited

U.S. PATENT DOCUMENTS

| | | | |
|---|---|---|---|
| 8,579,759 B2* | 11/2013 | Akebono et al. | 477/5 |
| 8,612,078 B2* | 12/2013 | Schulte et al. | 701/22 |
| 8,793,041 B2* | 7/2014 | Yamamoto et al. | 701/22 |
| 2004/0112654 A1* | 6/2004 | Kozarekar et al. | 180/65.2 |
| 2013/0041530 A1* | 2/2013 | Schulte et al. | 701/22 |
| 2013/0154344 A1* | 6/2013 | Imamura | 303/3 |
| 2013/0311024 A1* | 11/2013 | Tagawa et al. | 701/22 |
| 2013/0311025 A1* | 11/2013 | Tagawa et al. | 701/22 |
| 2013/0311029 A1* | 11/2013 | Tagawa et al. | 701/22 |
| 2014/0107879 A1* | 4/2014 | Schulte et al. | 701/22 |

* cited by examiner

DRIVE CONTROL APPARATUS FOR PROVIDING DRIVE CONTROL TO A HYBRID ELECTRIC VEHICLE, AND HYBRID ELECTRIC VEHICLE

CROSS REFERENCE TO RELATED APPLICATION

This application is a 35 U.S.C. 371 National Phase Entry Application from PCT/JP2011/000728, filed Feb. 9, 2011, the disclosure of which is incorporated herein in their entirety by reference.

TECHNICAL FIELD

The present invention relates to a drive control apparatus for a hybrid electric vehicle including an engine and a motor generator, as power sources. More particularly, the present invention relates to a drive control apparatus suitable for controlling the power sources in a way to achieve a driving torque at a given target.

BACKGROUND ART

For example, Patent Literature 1 listed below describes one of hybrid electric vehicles including a motor generator, as another power source, other than an engine. In the hybrid electric vehicle disclosed in this Patent Literature 1, if operating conditions, such as, a travelling speed, are fulfilled, driving the vehicle only by the motor generator, with the engine halted, improves fuel efficiency. Patent Literatures 2 and 3 listed below describe hybrid electric vehicles including two motor generators as other power sources than an engine, in which such motor generators are controlled in response to operating conditions.

However, as Patent Literature 4 listed below describes, the vehicle vibration takes place due to cogging torque of the motor generators in motor drive mode at such extremely low speeds that the vehicle is about to come to a standstill. This is addressed by technologies, as described in said Patent Literature 3, to restrain and prevent such vehicle vibrations taking place due to cogging torque of the motor generators by controlling operations of the two motor generators. Moreover, the hybrid electric vehicles have a power split and composition device in the form of, for example, planetary gear sets, which provides a torque split or a torque composition among the torque from the engine, the motor torque from the motor generators and the reaction torque from the road.

PRIOR ART

Patent Literatures

Patent literature 1: JP-A 2007-131103
Patent literature 2: JP-A 2007-237885
Patent literature 3: JP-A 2008-265599
Patent literature 4: JP-A 2006-67665

SUMMARY OF INVENTION

Problem to be Solved by Invention

However, it may increase the load on a system including two motor generators and a power split and composition device to let the two motor generators operate in order to restrain and prevent vehicle vibrations caused by cogging torque, increasing the counter torque applied to the parts in particular. Especially, it is likely that the torque applied to one-way clutch, which is provided to receive counter torque to prevent it from reversing the direction of revolution of the engine output shaft, may become too high. There is some possibility of increasing the torque applied to the one-way clutch too much due to a stepwise change if the two motor generators operate immediately after a shift from an engine drive mode to a motor drive mode, in which only the motor generators are used as source of drive, initiated by halting the engine.

The present invention addresses the above-mentioned problem. An object of the present invention is to provide a drive control apparatus for a hybrid electric vehicle capable of restraining and preventing excessive increase in torque applied to a device for restricting the direction of engine revolution like a one-way clutch for restricting the direction of engine revolution and a hybrid electric vehicle.

Means to Solve Problem

In order to solve the above-mentioned problem, there is provided, according to one aspect of the present invention, a drive control apparatus for a hybrid electric vehicle, including an engine, a device for restricting the direction of revolution of an engine output shaft of said engine, a drive shaft connected to a traction wheel, a first motor generator, a second motor generator, and a power split and composition device with four rotary elements coupled to said first motor generator, second motor generator, drive shaft and engine, respectively, the drive control apparatus characterized by comprising:

a driving torque target setting function configured to set a driving torque target; and a motor generator control function configured to control operation of the first motor generator and second motor generator in response to said driving torque target, said motor generator control function including:

a motor generator first sharing ratio setting function configured to set a motor generator first sharing ratio in response to said driving torque target in motor generator drive mode in which, with said engine halted, one of said first and second motor generators is mainly used as a source of drive, and;

a motor generator drive mode control function configured to put both of said first and second motor generators in operation by controlling operation of the other of said first and second motor generators in response to said motor generator first sharing ratio under a predetermined operating condition, in which vehicle vibrations may take place, during driving in said motor generator drive mode.

Further, said motor generator first sharing ratio setting function sets the motor generator first sharing ratio such that when said driving torque target is greater than or equal to a driving torque target second predetermined value, the motor generator first sharing ratio is zero, while, when said driving torque target is less than the driving torque target second predetermined value, the motor generator first sharing ratio gets closer to one as the driving torque target becomes smaller, and said motor generator drive mode control function sets a motor generator torque target for the other motor generator of said first and second motor generators by multiplying a driving power target, calculated from the driving torque target, by said motor generator first sharing ratio, and also a motor generator torque target for the one motor generator of said first and second motor generators based on a driving power given by subtracting a driving power portion, derived from the motor generator torque target for the other, from said driving power target.

Further, said motor generator control function includes a motor generator second sharing ratio setting function configured to set a motor generator second sharing ratio in response to engine downtime caused due to halting the engine to initiate motor generator drive mode, and said motor generator drive mode control function sets a motor generator torque target for the other motor generator of said first and second motor generators by multiplying said driving power target by said motor generator second sharing ratio, and also a motor generator torque target for the one motor generator of said first and second motor generators based on a driving power given by subtracting a driving power, derived from the motor generator torque target for the other, from said driving power target.

Further, said motor generator second sharing ratio setting function sets the motor generator second sharing ratio such that when said engine downtime is less than or equal to an engine downtime first predetermined value, the motor generator second sharing ratio is zero, while, when said engine downtime is greater than the engine downtime second predetermined value, the motor generator second sharing ratio gets closer to one as the engine downtime becomes greater.

Effect of Invention

According to the embodiment of the invention, an engine, a first motor generator and a second motor generator are provided as power sources, one of the directions of revolution of the engine output shaft is restricted by an engine revolution restricting device, and four rotary elements of a power split and composition device are coupled to a drive shaft connected to a traction wheel, the first motor generator, the second motor generator and the engine, respectively. Further, with regard to controlling operation of the first and second motor generators by setting a driving torque target for the vehicle, a motor generator first sharing ratio is set in response to the driving torque target for use in a motor generator drive mode, in which one of the first and second motor generators is mainly put into operation, initiated by halting the engine. Under a predetermined operating condition, in which vehicle vibrations may take place, during driving in motor generator drive mode, both of the first and second motor generators are put into operation by controlling operation of the other of the first and second motor generators in response to the motor generator first sharing ratio. Accordingly, it is made possible to reduce the motor generator torque target from the other of the first and second motor generators only by setting the motor generator sharing ratio in response to the magnitude of the driving torque target, making it possible to restrain and prevent the torque applied to the revolution restricting device from becoming excessively large when controlling operation of the first and second motor generators in the motor generator drive mode.

The motor generator first sharing ratio is set such that when the driving torque target is greater than or equal to a driving torque target second predetermined value, the motor generator first sharing ratio is zero, while, when said driving torque target is less than the driving torque target second predetermined value, the motor generator first sharing ratio gets closer to one as the driving torque target becomes smaller. A motor generator torque target is set for the other motor generator of the first and second motor generators by multiplying a driving power target, calculated from the driving torque target, by the motor generator first sharing ratio. In addition, a motor generator torque target is set for the one motor generator of said first and second motor generators based on a driving power given by subtracting a driving power portion, derived from the motor generator torque target for the other, from the driving power target. Therefore, it is made possible to reduce the motor generator torque target from the other of the first and second motor generators when the magnitude of the driving torque target is large, making it possible to restrain and prevent the torque applied to the revolution restricting device from becoming excessively large when controlling operation of the first and second motor generators in the motor generator drive mode.

A motor generator second sharing ratio is set in response to engine downtime caused due to halting the engine to initiate motor generator drive mode, and a motor generator torque target for the other motor generator of the first and second motor generators is set by multiplying the driving power target by the motor generator second sharing ratio. Further, a motor generator torque target for the one motor generator of said first and second motor generators is set based on a driving power given by subtracting a driving power, derived from the motor generator torque target for the other, from the driving power target. Therefore, it is made possible to reduce the motor generator torque target from the other of the first and second motor generators by setting the motor generator second sharing ratio in response to the length of the engine downtime, making it possible to restrain and prevent the torque applied to the revolution restricting device from becoming excessively large when controlling operation of the first and second motor generators in the motor generator drive mode.

The motor generator second sharing ratio is set such that when the engine downtime is less than or equal to an engine downtime first predetermined value, the motor generator second sharing ratio is zero, while, when the engine downtime is greater than the engine downtime first predetermined value, the motor generator second sharing ratio gets closer to one as the engine downtime becomes greater. Therefore, it is made possible to reduce the motor generator torque target from the other of the first and second motor generators when the length of the engine downtime is short, making it possible to restrain and prevent the torque applied to the revolution restricting device from becoming excessively large when controlling operation of the first and second motor generators in the motor generator drive mode.

BRIEF DESCRIPTION OF DRAWINGS

FIG. 17A illustrates the amplitude of vibration when only second motor generator is used as a source of drive. FIG. 17B illustrates the amplitude of vibration when only first motor generator is used as a source of drive. FIG. 17C illustrates the combined amplitude of vibration when both first and second motor generators are used as sources of drive.

DESCRIPTION OF EMBODIMENT(S)

Referring, next, to the drawings, one embodiment of a drive control apparatus for providing a drive control to a hybrid electric vehicle according to the present invention is described.

Figure 1:
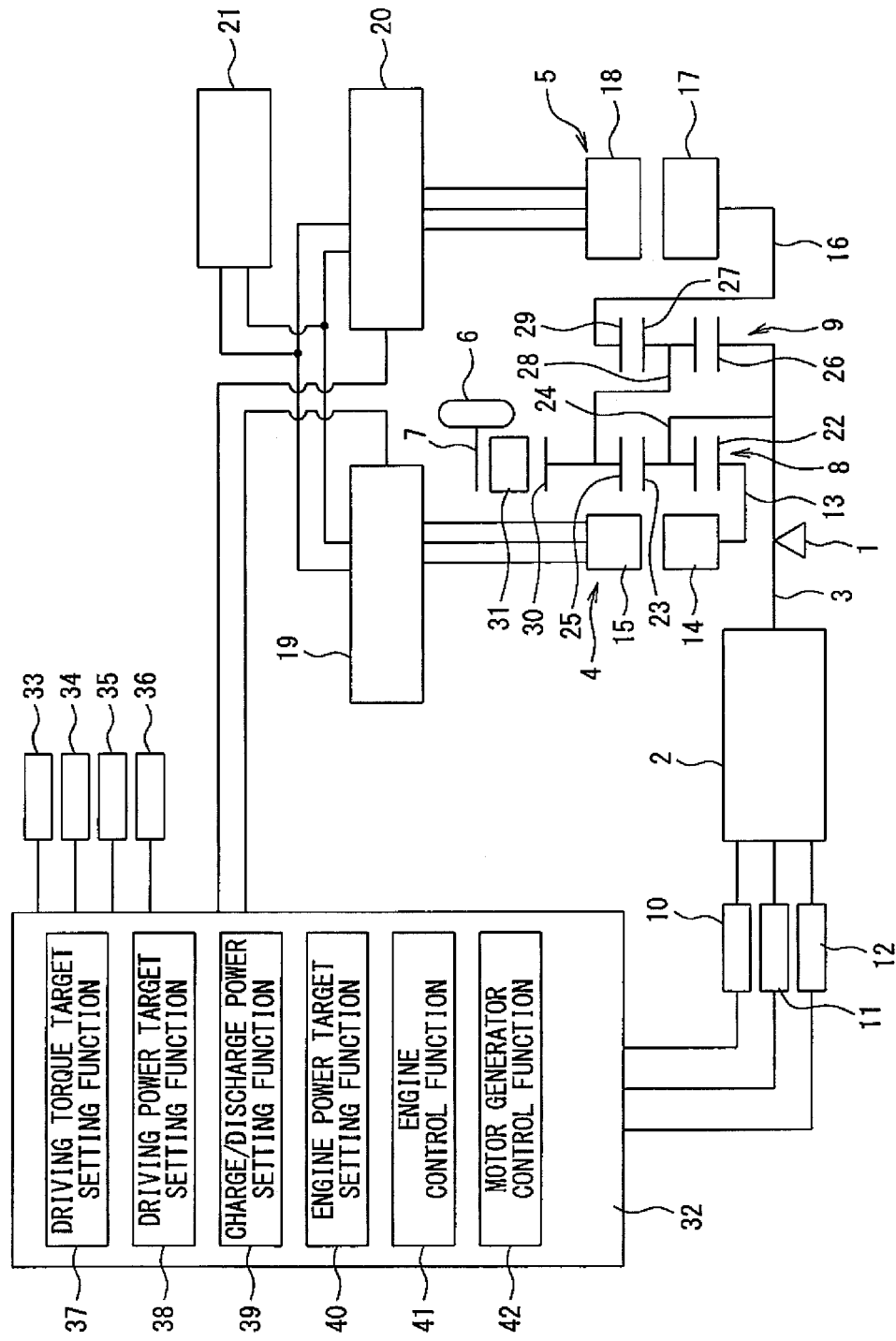
FIG. 1 is a system configuration diagram, showing one embodiment of a drive control apparatus for providing drive control to a hybrid electric vehicle according to the present invention.

FIG. 1 shows a system configuration diagram showing the embodiment of drive control apparatus for providing drive control to a hybrid electric vehicle according to the present invention. The hybrid electric vehicle according to this embodiment includes, as its powertrain, an engine 2 (internal combustion engine) configured to deliver engine power by providing internal combustion of fuel, a first motor generator (or a motor) 4 and a second motor generator (or a motor) 5, each being configured to deliver power by receiving electric energy (in a motor drive mode) or generate electric energy in a regenerative mode, a traction shaft 7 connected to a traction wheel 6 of the vehicle, a first planetary gear set 8 and a second planetary gear set 9, which provide a power split and composition device that composes or splits driving power delivered from said engine 2, the first and second motor generators 4 and 5 and the ground reaction that is delivered from the traction wheels 6, and an output gearing 31 that provides a drive connection between the power split and composition device and the traction shaft 7.

Engine 2 includes: a mass air flow adjustment unit 10, like a throttle valve, configured to adjust conditions of intake air in response to the position of an accelerator pedal that is not illustrated; a fuel admission system 11, like a fuel injection system, configured to adjust conditions of admission of fuel in response to the conditions of intake air; and an ignition manager 12, like an ignition system, configured to adjust conditions of igniting fuel. Accordingly, combustion of fuel in engine 2 may be controlled by coordinating the conditions of intake air by operating the mass air flow adjustment unit 10, conditions of injection fuel by operating the fuel admission system 11 and conditions of igniting fuel by operating the ignition manager 12, resulting in modulation of engine power from the engine 2, specifically modulation of rotational speed and torque, which may be hereinafter described also as engine speed and engine torque. A one-way clutch 1 is provided, as an engine revolution restricting device, to allow the engine output shaft 3 of engine 2 to rotate in one direction only and regulate its rotation in the opposite direction.

First motor generator 4 has a first rotor shaft 13, a first rotor 14 and a first stator 15. Second motor generator 5 has a second rotor shaft 16, a second rotor 17 and a second stator 18. First stator 15 of first motor generator 4 is electrically coupled to a first inverter 19, and second stator 18 of second motor generator 5 is electrically coupled to a second inverter 20. First and second inverters 19 and 20 are electrically coupled to a battery 21. First and second inverters 19 and 20 adjust electrical energy delivered from the battery 21 to first and second stators 15 and 18 via adjusting, for example, field current so as to adjust motor power from first motor generator 4 and motor power from second motor generator 5, specifically, rotational speed and driving torque (which may be hereinafter described also as motor-generator rotational speed and motor-generator torque). Moreover, each of first and second motor generators 4 and 5 is operable in regenerative mode to generate electricity when torque is directed in a direction opposite to a direction of rotation, so that the generated electrical energy may be used to charge the battery 21.

First planetary gear set 8, as is well known in the art, includes a first sun gear 22, a first carrier 24, which carries first planetary gears 23, and a first ring gear 25. Second planetary gear set 9 includes a second sun gear 26, a second carrier 28, which carries second planetary gears 27, and a second ring gear 29. In this embodiment, the engine 2, first motor generator 4, second motor generator 5, first planetary gear set 8 and second planetary gear set 9 are all disposed on the same axis. First carrier 24 of first planetary gear set 8 and second sun gear 26 of second planetary gear set 9 are coupled together and connected drivably to the engine output shaft 3 of the engine 2. First sun gear 22 of first planetary gear set 8 is connected drivably to first rotor shaft 13 of first motor generator 4. Second ring gear 29 of second planetary gear set 9 is connected drivably to second rotor shaft 16 of second motor generator 5. First ring gear 25 of first planetary gear set 8 and second carrier 28 of second planetary gear set 9 are coupled together and connected to traction shaft 7 for traction wheel 6. Drive connection to traction shaft 7 is accomplished by connecting an output portion 30 such as a gear formed on the outer circumference of first ring gear 25 of first planetary gear set 8 to traction shaft 7 with output gearing 31. Drive connection of each of a portion of rotating elements of first planetary gear set 8 to the corresponding one of rotating elements of second planetary gear set 9 is accomplished directly without any power transmitting gear between them, and drive connection of each of the remainder of the rotating elements to the corresponding one of first motor generator 4, second motor generator 5 and engine 2 is accomplished similarly.

Mass air flow adjustment unit 10 to adjust conditions of intake air entering said engine 2, fuel admission system 11 to adjust conditions of admission of fuel, ignition manager 12 to adjust conditions of igniting fuel, first inverter 19 to adjust electrical energy to first stator 15 of first motor generator 4, second inverter 20 to adjust electrical energy to second stator 18 of second motor generator 5 are connected to drive-control controller (drive control function) 32. The drive-control controller 32 is composed of: a driving torque target setting function 37 to set driving torque needed for propelling the vehicle; a driving power target setting function 38 to set a driving power target to obtain driving torque with the vehicle travelling at a vehicle speed; a charge/discharge power target setting function 39 to set a charge/discharge power to said battery 21 judging from the state of charge of battery 21; an engine power target setting function 40 to set an engine power target to obtain a driving power target while achieving the charge/discharge power target; an engine control function 41 to set an efficient engine speed and engine torque in response to the engine power target; and a motor generator control function 42 to control first inverter 19 and second inverter 20 so that the total electricity of first motor generator 4 and second motor generator 5 becomes the charge/discharge power target. The drive-control controller 32 is composed of processor controller like microcomputer, and said setting functions and control functions are built by data processing performed in said drive-control controller 32.

The vehicle includes: an accelerator pedal position sensor 33 configured to detect the position of an accelerator pedal as an accelerator position Acc; a vehicle speed sensor 34 configured to detect a vehicle speed Vc; an engine speed sensor 35 configured to detect the rotational speed of the engine 2 as an engine speed Neng; and a battery state of charge sensor 36 configured to detect the amount of electrical energy SOC in the battery 21. The drive-control controller 32 reads the detected signals from these sensors and controls operating conditions of engine 2, first motor generator 4 and second motor generator 5 by coordinating mass air flow adjustment unit 10, fuel admission system 11, ignition manager 12, and first and second inverters 19 and 20 in accordance with processing described later.

As described before, according to the present embodiment, first carrier 24 of first planetary gear set 8 and second sun gear 26 of second planetary gear set 9 are directly coupled together, and first ring gear 25 of first planetary gear set 8 and second carrier 28 of second planetary gear set 9 are directly coupled together. Therefore, first carrier 24 and second sun gear 26 turn at the same speed on collinear diagrams for two planetary gear sets 8 and 9, and first ring gear 25 and second carrier 28 turn at the same speed, too. Now, overlaying the two collinear diagrams for planetary gear sets 8 and 9 makes a collinear diagram, shown in FIG. 2, which has four vertical axes in total as four rotating elements, that is, from the left, an axis for first sun gear 22 of first planetary gear set 8 (an axis labeled "MG1" in FIG. 2: the first sun gear 22 being equivalent to first rotor shaft 13 of first motor generator 4), an axis for first carrier 24 of first planetary gear set 8 and second sun gear 26 of second planetary gear set 9 (an axis labeled "ENG" in FIG. 2: the first carrier 24 and second sun gear 26 being equivalent to the engine output shaft 3 of engine 2), an axis for first ring gear 25 of first planetary gear set 8 and second carrier 28 of second planetary gear set 9 (an axis labeled "OUT" in FIG. 2: first ring gear 25 and second carrier 28 being equivalent to output portion 30 of first ring gear 25, i.e. the traction shaft 7 for traction wheel 6), and an axis for second ring gear 29 of second planetary gear set 9 (an axis labeled "MG2" in FIG. 2: the second ring gear 29 being equivalent to second rotor shaft 16 of second motor generator 5). Then, a lever ratio indicative of the relation among the distances, each between the adjacent two of the vertical axes is found: assuming that the distance between the axes ENG and OUT is 1, the distance between the axes ENG and MG1 takes on the value k1 which results from dividing the number of teeth of first ring gear 25 of first planetary gear set 8 by the number of teeth of first sun gear 22, the distance between the axes OUT and MG2 takes on the value k2 which results from dividing the number of teeth of second sun gear 26 of second planetary gear set 9 by the number of teeth of second ring gear 29.

This collinear diagram for the power split and composition device is equivalent to what is previously proposed by the present applicant in JP Patent No. 3852562. The characteristic of the power split and composition system is that the first motor generator 4 and the second motor generator 5 are located on one and the other points where the remotest two of the four vertical axes are. The relation in which the first and second motor generators 4 and 5 are placed on where the remotest two of the four vertical axes are provides not only, as mentioned in above-mentioned JP Patent, a configuration free from disadvantages such as an increase in number of parts, an increase in size of system, an increase of mechanical loss and so forth, but also, as will be described later, a reduction in the magnitude of an exchange of electrical energy during driving in ordinary situations with a high gear ratio, which in turn improves fuel efficiency.

Hereinafter, referring to several collinear diagrams, relations between speed and torque of the engine 2, travelling speed of the vehicle, speed and torque of the first and second motor generator 4 and 5 are described. In each of the collinear diagrams, Tmg1 is the first motor-generator torque provided by first rotor shaft 13 of first motor generator 4, Tmg2 is the second motor-generator torque by second rotor shaft 16 of second motor generator 5, Teng is the engine torque by the engine output shaft 3 of engine 2, Tout is the output driving torque from the output portion 30, i.e. the driving torque delivered to the traction shaft 7. In each of the collinear diagrams, it is defined that the rotational speed has a positive direction when the direction is the same as that of the engine 2 and the torque, as an input along each of the four axes, has a positive direction when the direction is the same as that of the engine torque Teng. Therefore, the driving torque Tout from the output portion 30 moves the vehicle backward when it has a positive direction and forward when it has a negative direction. It is hereinafter assumed that no mechanical, electrical and physical losses take place in the following description.

Figure 2:
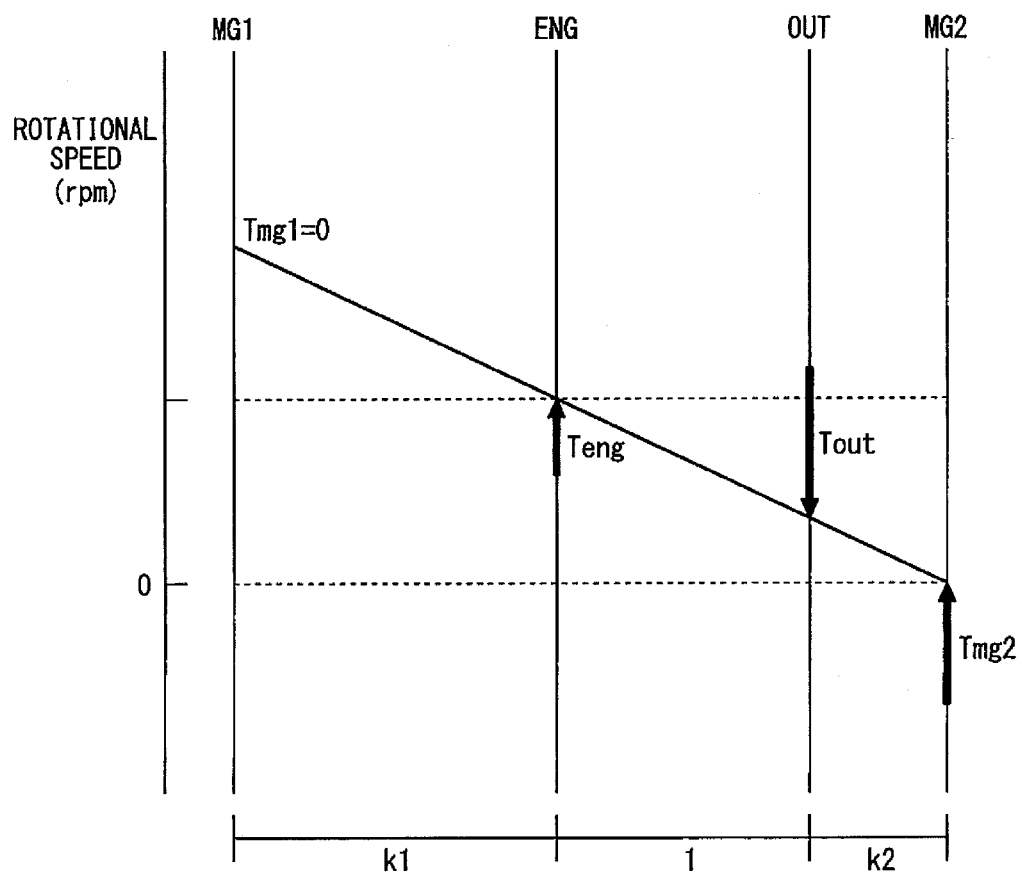
FIG. 2 is a collinear diagram for a power split and composition device in FIG. 1.

FIG. 2 represents a low-speed drive state in which the vehicle speed Vc is relatively low and the engine (ENG) 2 turns in a positive rotational direction to provide a positive engine torque Teng. Although first motor generator (MG1) 4 turns in the positive rotational direction at a high speed, the first motor-generator torque Tmg1 remains 0. Although second motor generator (MG2) 5 provides a positive second motor-generator torque Tmg2, second motor generator (MG2) 5 does not consume electrical power because the second motor-generator rotational speed Nmg2 is 0 (operation out of motoring mode). In this case, since a ratio of engine speed Neng of the engine 2 to rotational speed of the output portion 30, i.e., vehicle speed Vc, called "a gear ratio," is expressed as (1+k2)/k2, a state of low gear ratio is established because the transmission ratio is greater than 1.

Figure 3:
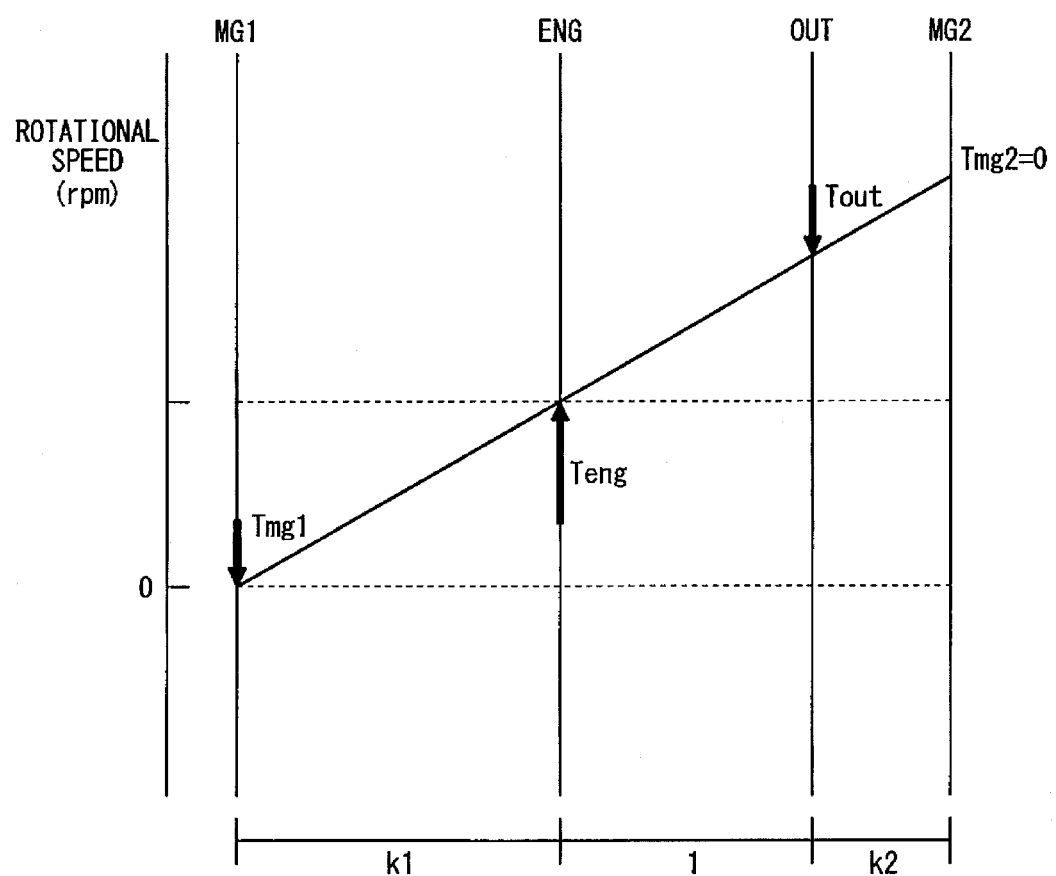
FIG. 3 is a collinear diagram for the power split and composition device in FIG. 1.

FIG. 3 represents a high-speed drive state in which the vehicle speed Vc is relatively high and the engine 2 turns in the positive rotational direction to provide a positive engine torque Teng. Although first motor generator (MG1) 4 provides a negative first motor-generator torque Tmg1, first motor-generator (MG1) 4 does not generate electrical power because the first motor-generator rotational speed Nmg1 is 0 (operation out of regenerating mode). Although second motor generator (MG2) 5 turns in the positive rotational direction at a high speed, the second motor-generator torque Tmg2 remains 0. In this case, since a ratio of engine speed Neng of the engine 2 to rotational speed of the output portion 30, i.e., vehicle speed Vc, called "a gear ratio," is expressed as k1/(1+k1), a state of high gear ratio is established because the transmission ratio is less than 1.

Figure 4:
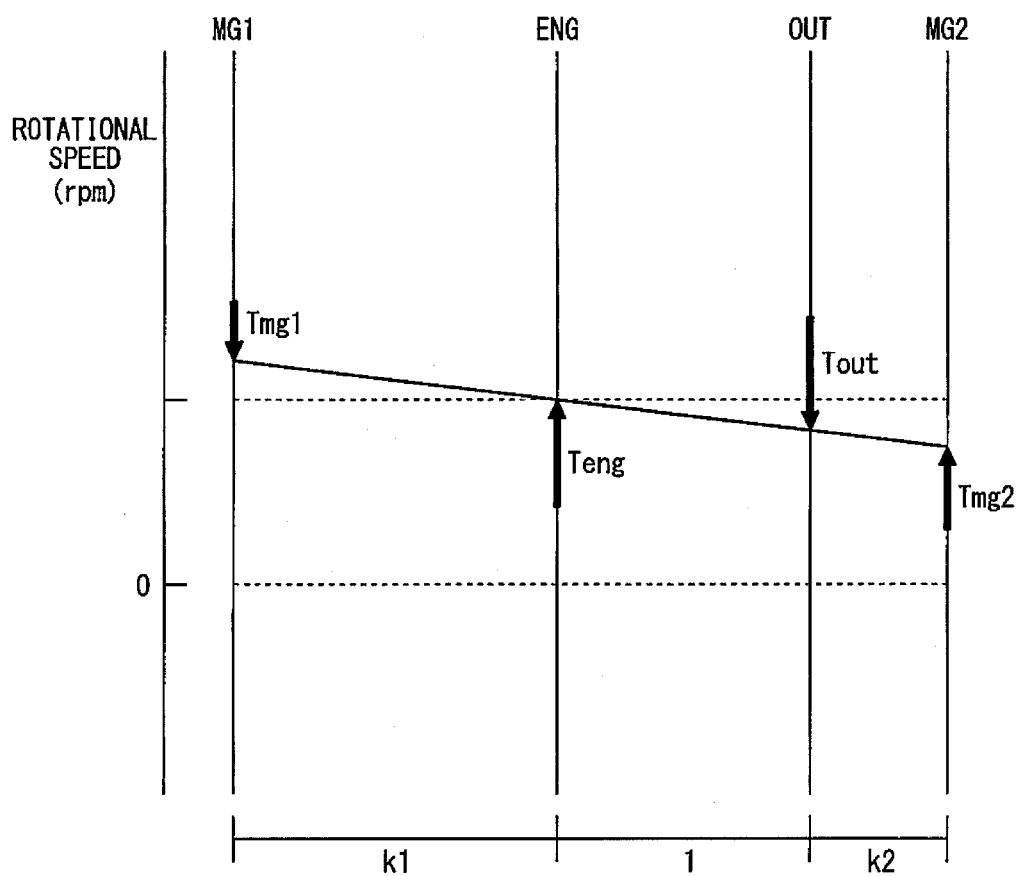
FIG. 4 is a collinear diagram for the power split and composition device in FIG. 1.

FIG. 4 represents, for example, in the illustrated state, a middle-speed drive state, which corresponds to a state of intermediate gear ratio between the low gear ratio state of FIG. 2 and high gear ratio state of FIG. 3, in which the vehicle speed Vc is middle and the engine 2 turns in a positive rotational direction to provide a positive engine torque Teng. First motor generator 4 turns in a positive rotational direction to provide a negative first motor-generator torque Tmg1. First motor generator 4 in fact generates electrical power (operation in generating mode). On the other hand, second motor generator 5 generates a positive second motor-generator torque Tmg2 though it turns in a positive rotational direction. Second motor generator 5 in fact is consuming electrical power (operation in motoring mode). When there is no charge to or discharge from the battery 21, an exchange of electrical energy may be nicely balanced by powering second motor generator 5 with electrical power generated by first motor generator 4.

Thus, it is possible for the power split and composition device according to the present embodiment to provide a suitable driving torque Tout to any one of various operating conditions of the engine by controlling the first and second motor generators 4 and 5 over a wide speed range from low speed to high speed. In principle, the hybrid electric vehicle according to this embodiment in fact does not need any transmission. Moreover, it is possible to drive the vehicle backward even when the engine 2 keeps running. It is also possible to drive the vehicle forward or backward with only both or one of first motor generator 4 and second motor generator 5 after halting the engine 2. In this situation, as described in JP Patent No. 3852562, the rotational speed of engine 2 should remain 0, so that if torque is imparted to engine output shaft 3 in negative direction, such torque has to be received by one-way clutch 1.

As is clear from these collinear diagrams, a first motor generator rotational speed Nmg1 is given by the following formula (1) and a second motor generator rotational speed Nmg2 by the following formula (2). In each of the formulas, Neng is the engine speed, and Nout is the output rotational speed of output portion 30, in which the output rotational speed Nout is derived from the vehicle speed Vc, the final reduction ratio and the reduction ratio of output gearing 31.

$$Nmg1=(Neng-Nout)\times k1+Neng \quad (1)$$

$$Nmg2=(Nout-Neng)\times k2+Nout \quad (2).$$

Input torques to the planetary gear sets are balanced when the following equation (3) holds. Electrical power generated or consumed by first and second motor generators 4 and 5 is equal to input/output electrical power (charge/discharge power) Pbat to/from battery 21 when the following equation (4) holds. Rotational speeds Nmg1 and Nmg2 are indicated in rpm (revolution per minute or rotation per minute).

$$Teng+(1+k2)\times Tmg1=k2\times Tmg2 \quad (3)$$

$$Nmg1\times Tmg1\times 2\pi/60+Nmg2\times Tmg2\times 2\pi/60=Pbat \quad (4).$$

As later described, a method is described for setting engine speed target Nengt and engine torque target Tengt which are considered to provide efficient operation. In the present embodiment, as described in JP-A 2008-12992 in which the applicant previously made a proposal, the setting is such that, for a given engine power request, the higher the vehicle speed, the higher the engine speed target Nengt becomes and the lower the engine torque target Tengt becomes.

Figure 5:
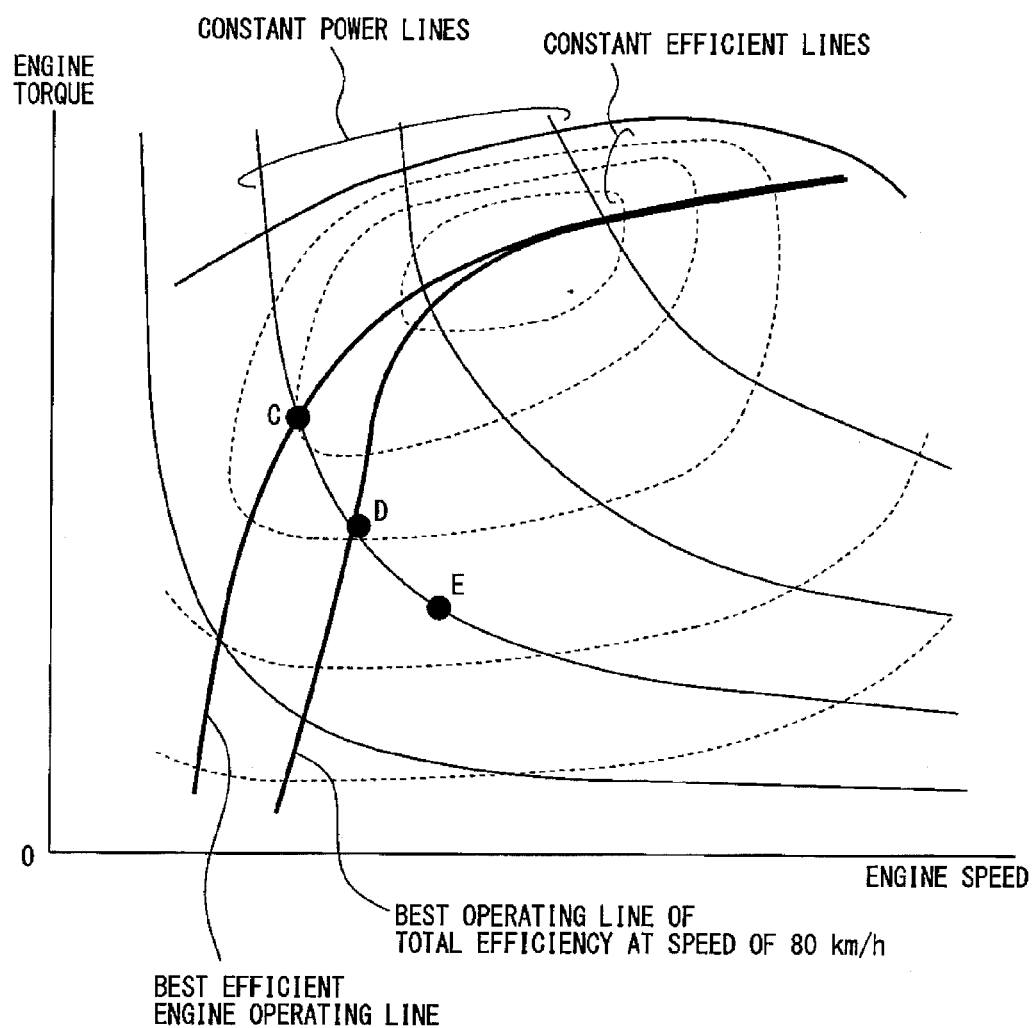
FIG. 5 is an engine characteristic diagram used to describe operating points and operating lines.

Let, for example, the horizontal axis represent engine speed and the vertical axis engine torque as shown in FIG. 5, a family of constant engine power lines takes the form of a set of inverse proportions in graphical representation because the engine power is the product of engine speed and engine torque. The engine characteristic diagram contains a family of constant efficiency lines, each interconnecting constant efficiency points after a function test of the engine. If, for example, for a given engine power as a target, an engine speed and an engine torque, which constitute an operating point considered to provide the most efficient engine operation among all points on the engine power line for the given engine power, are set as an engine speed target Nengt and an engine torque target Tengt, driving with low fuel consumption caused due to at least efficient function operation of the engine may be provided. Connecting these points makes a line of best operation for engine efficiency as shown in FIG. 5. The engine speed target Nengt and engine torque target Tengt which have been set in the above mentioned example are now illustrated as an operating point C.

Figure 6:
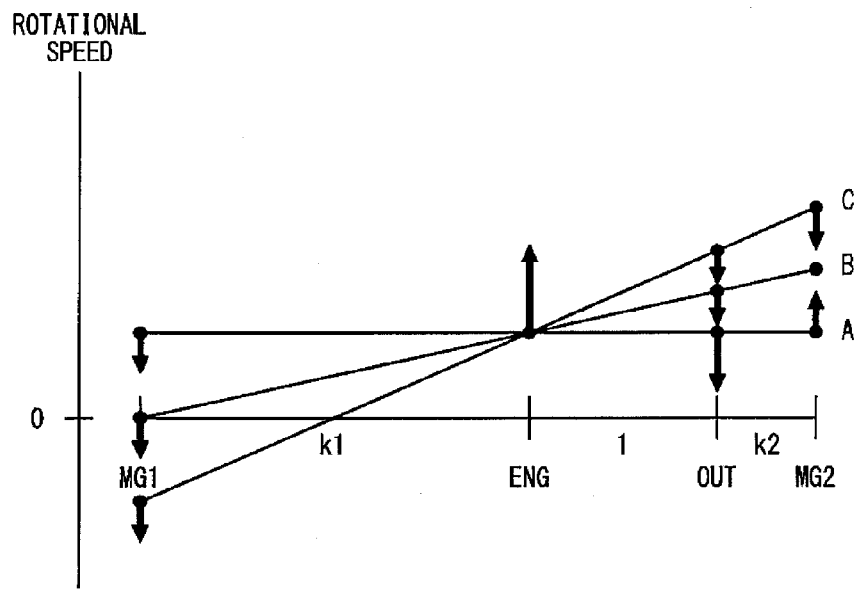
FIG. 6 is a collinear diagram for the power split and composition device in FIG. 1.

With the engine speed target Nengt and the engine torque target Tengt set in this manner and fixed, let the vehicle speed Vc, i.e. the output rotational speed Nout, vary as shown in FIG. 6. In this case, when the vehicle speed Vc is low and the output rotating speed Nout is low alike, both the first motor generator speed Nmg1 and the second motor generator speed Nmg2 are positive, while the first motor generator torque Tmg1 takes on a negative value and the second motor generator torque Tmg2 takes on a positive value, as indicated on a lever A in the collinear diagram in FIG. 6. In this case, the first motor generator 4 operates in generating mode and the second motor generator 5 in motoring mode, but they rotate in the same positive rotational direction, causing no circulation of power (motive power).

Similarly, when the vehicle speed Vc becomes a little higher (40 km/h, for example) and the output rotational speed Nout also becomes a little higher, the first motor generator rotational speed Nmg1 becomes 0, the first motor generator torque Tmg1 becomes negative, the second motor generator rotational speed Nmg2 becomes positive and the second motor generator torque Tmg2 becomes 0 as indicated on a lever B in the collinear diagram shown in FIG. 6 (the same as the state of high gear ratio shown in FIG. 3). There is no circulation of power (motive power) either in this case.

Figure 7:
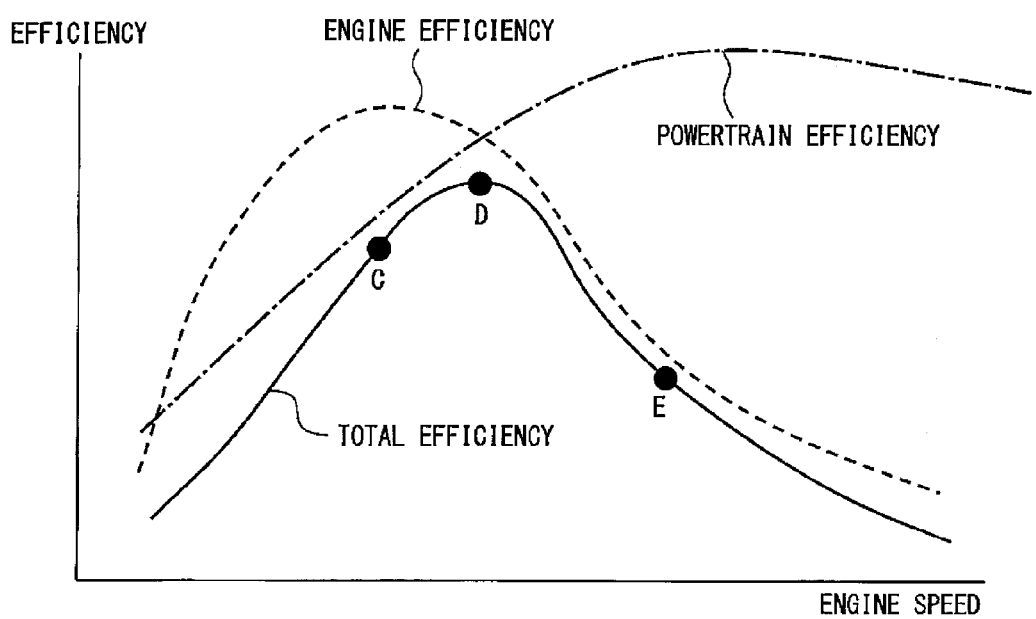
FIG. 7 is an explanatory diagram, showing the relationship between engine speed and efficiency.

However, when the vehicle speed Vc becomes still higher (80 km/h, for example) and the output rotational speed Nout becomes still higher alike, the first motor generator rotational speed Nmg1 becomes negative, the first motor generator torque Tmg1 takes on a negative value, the second motor generator rotational speed Nmg2 takes on a positive value and the second motor generator torque Tmg2 takes on a negative value as indicated on a lever C in the collinear diagram shown in FIG. 6. This state is characterized by operation of the first motor generator 4 in motoring mode in negative direction, operation of the second motor generator 5 in generating mode, causing circulation of power (motive power) and a reduction in powertrain efficiency. As shown in FIG. 7, this reduction in powertrain efficiency causes a reduction in overall efficiency despite the fact that the engine efficiency is high, so that operating point C is lower in overall efficiency than operating point D.

Figure 8:
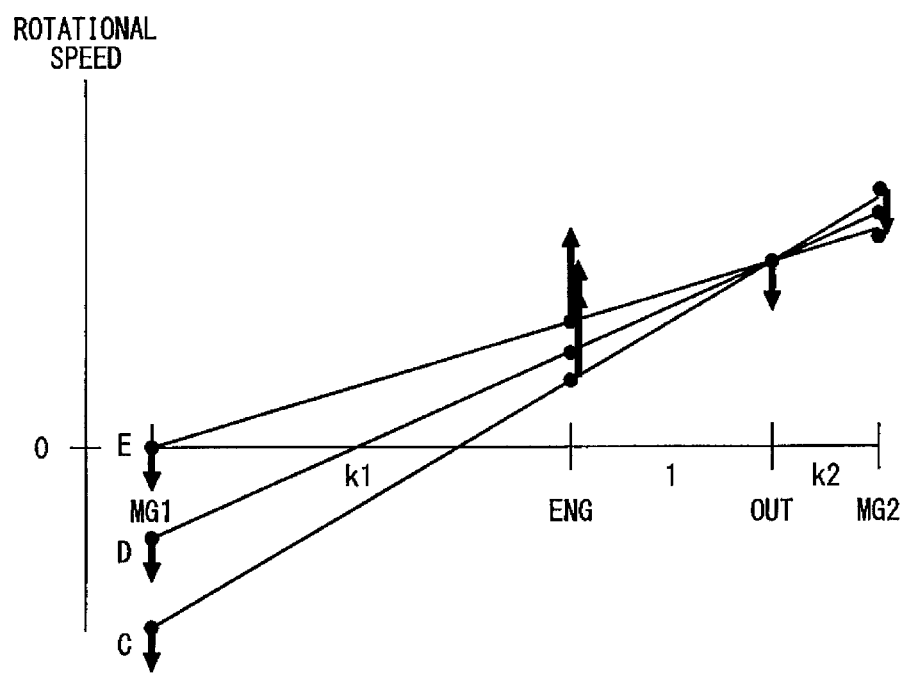
FIG. 8 is a collinear diagram for the power split and composition device in FIG. 1.

Increasing the first motor generator rotational speed Nmg1 to a level equal to or higher than 0, as indicated by a lever E in the collinear diagram shown in FIG. 8, may be considered as one approach to prevent circulation of power during driving at such high speed (80 km/h, for example) but this approach causes an increase in engine speed. Such increase in engine speed also causes a reduction in overall efficiency even though the powertrain efficiency is high as indicated at a point E in FIG. 7.

Figure 9:
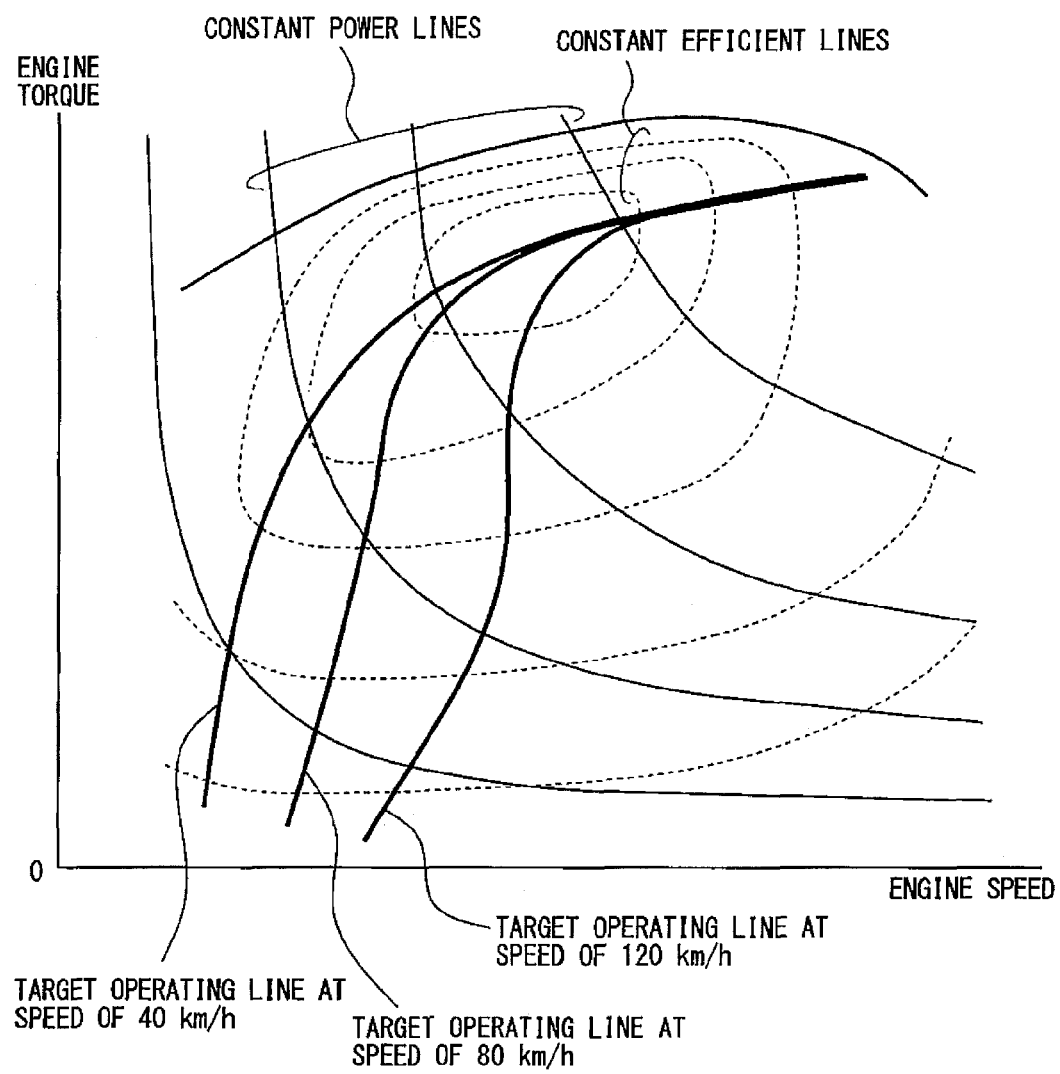
FIG. 9 is the engine characteristic diagram expressed as a control map for operating line retrieval.

Accordingly, setting the engine speed for driving at such high speed (80 km/h, for example) to a point D lying between points C and E shown in FIG. 7 (see a lever D in the collinear diagram shown in FIG. 8), as shown in FIG. 5, this engine speed at this operating point D is used as an engine speed target Nengt and an engine torque found on the constant power line for the given engine power target against the engine speed target Nengt is used as an engine torque target Nengt. For those reasons, as shown in FIG. 9, when, for example, an engine power target is given, the target operating line for the given engine power target varies in response to the vehicle speed in such a way as to provide the setting that, overall, the higher the vehicle speed Vc, the higher the engine speed target Nengt becomes and the lower the engine torque target Tengt becomes.

Figure 10:
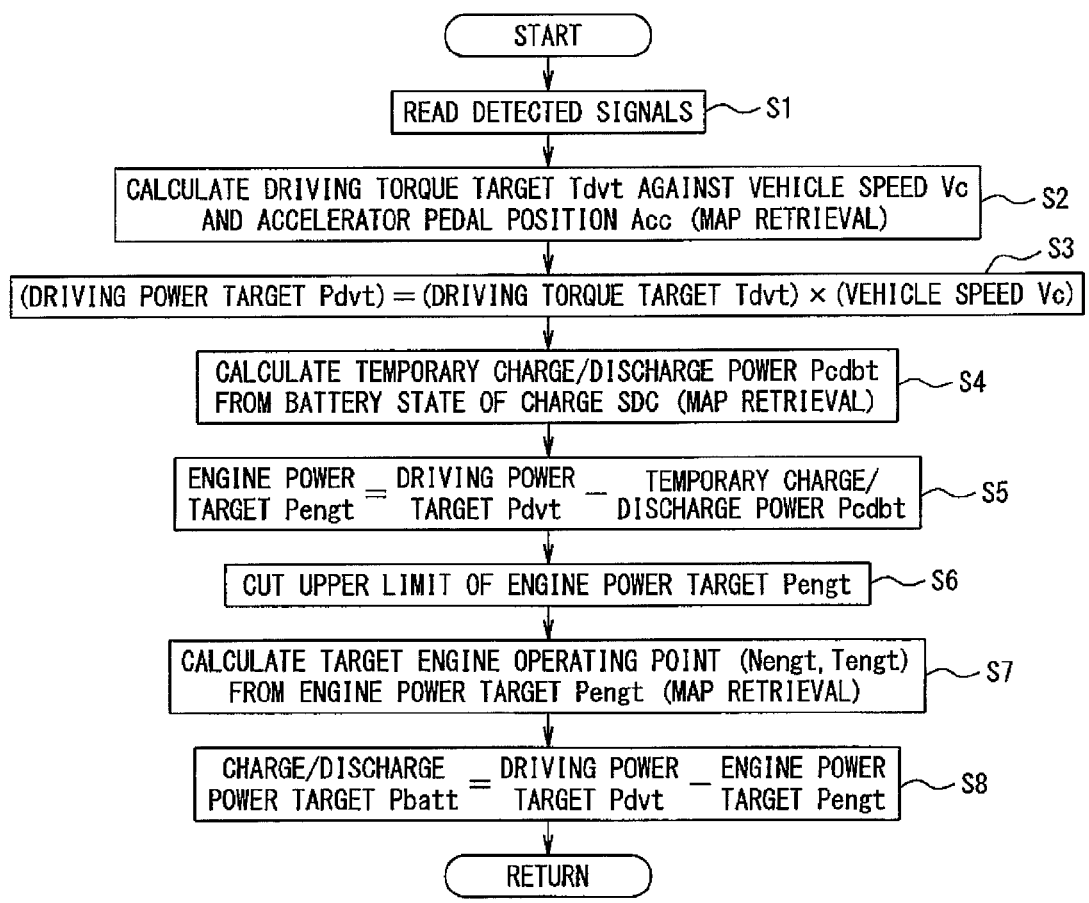
FIG. 10 is a flow chart representing routine performed by a drive-control controller shown in FIG. 1.

Referring, next, to the flow chart shown in FIG. 10, a routine in said drive-control controller 32 is described, the routine building said driving torque target setting function 37, driving power target setting function 38, charge/discharge power target setting function 39, engine power target setting function 40 and engine control function 41.

This routine may be executed, for example, in accordance with a processing strategy such as interrupt-driven using a timer to generate periodic interrupts, one upon elapse of a predetermined sampling time (for example, 10 msec.), and it is initiated with reading the detected signals from said accelerator pedal position sensor 33, vehicle speed sensor 34, engine speed sensor 35 and battery state of charge sensor 36 at step S1.

Figure 11:
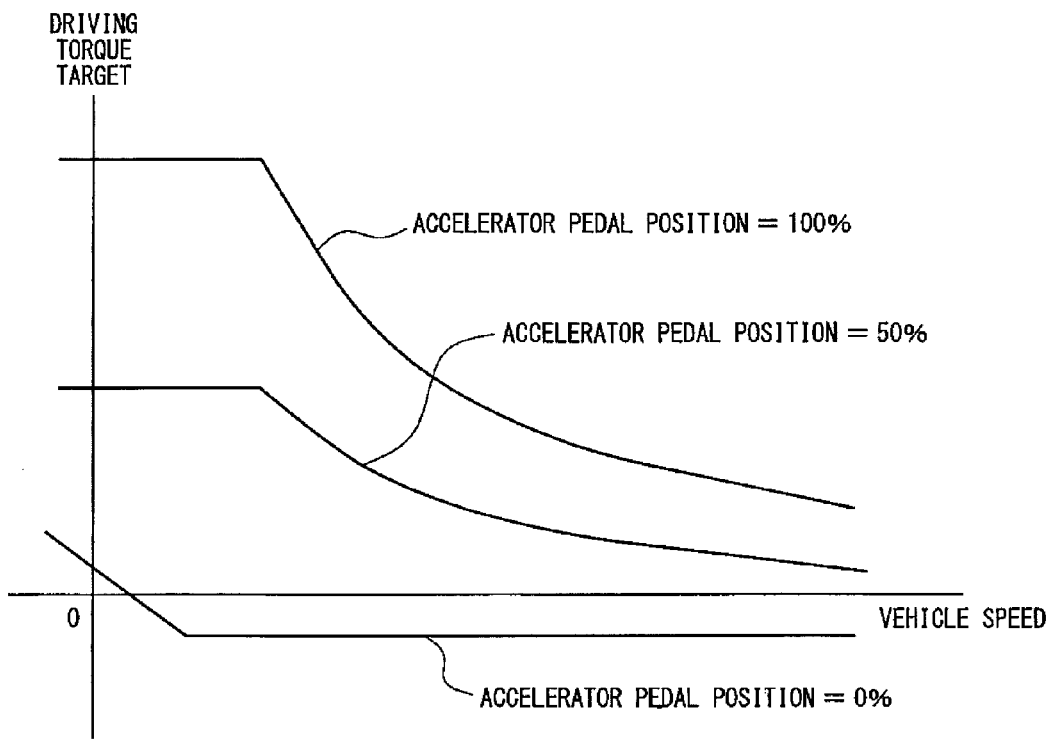
FIG. 11 is a control map used in the routine shown in FIG. 10.

Then, the routine proceeds to step S2, at which a driving torque target Tdvt responsive to the vehicle speed Vc and the accelerator pedal position Acc is calculated by retrieval of, for example, a map shown in FIG. 11 (constituting the driving torque target setting function 37).

Then, the routine proceeds to step S3, at which a driving power target Pdvt is calculated by multiplying the driving torque target Tdvt that has been calculated at said step S2 by the vehicle speed Vc (constituting the driving power target setting function 38).

Figure 12:
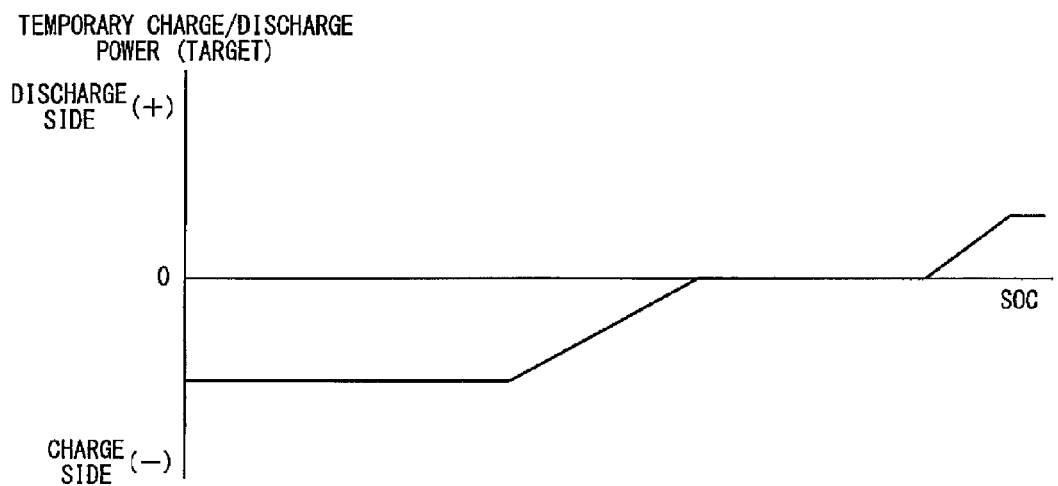
FIG. 12 is a control map used in the routine shown in FIG. 10.

Then, the routine proceeds to step S4, at which a temporary charge/discharge power Pcdbt is calculated by retrieval of, for example, a map shown in FIG. 12 versus the battery state of charge SOC.

Then, the routine proceeds to step S5 to calculate engine power target Pengt by subtracting the temporary charge/discharge power Pcdbt calculated in step S4 from the driving power target Pdvt calculated in said step S3 (constituting the engine power target setting function 40).

Next, the routine proceeds to step S6 at which engine power target Pengt is subject to upper limit cut-off process (constituting engine power target setting function 40). This upper limit is the maximum of engine power which engine 2 can provide.

Next, the routine proceeds to step S7 at which that engine power target Pengt, which has been subject to upper limit cut-off process, is used for retrieval of a map shown in FIG. 9 to find a target engine operating point, i.e. a set of an engine speed target Nengt and an engine torque target Tengt (constituting engine control function 41).

Next, the routine proceeds to step S8 to calculate a charge/discharge power target Pbatt by subtracting the engine power target Pengt, which has been subject to upper limit cut-off process at said step S6, from the driving power target Pdvt calculated at said step S3 (constituting charge/discharge power target setting function 39), and returns to the main program.

In addition, engine control function 41 controls conditions of intake air adjusted by mass air flow adjustment unit 10, conditions of admission of fuel adjusted by fuel admission system 11 and conditions of igniting fuel adjusted by ignition manager 12 to achieve the engine speed target Nengt and the engine torque target Tengt calculated at step S7.

Figure 13:
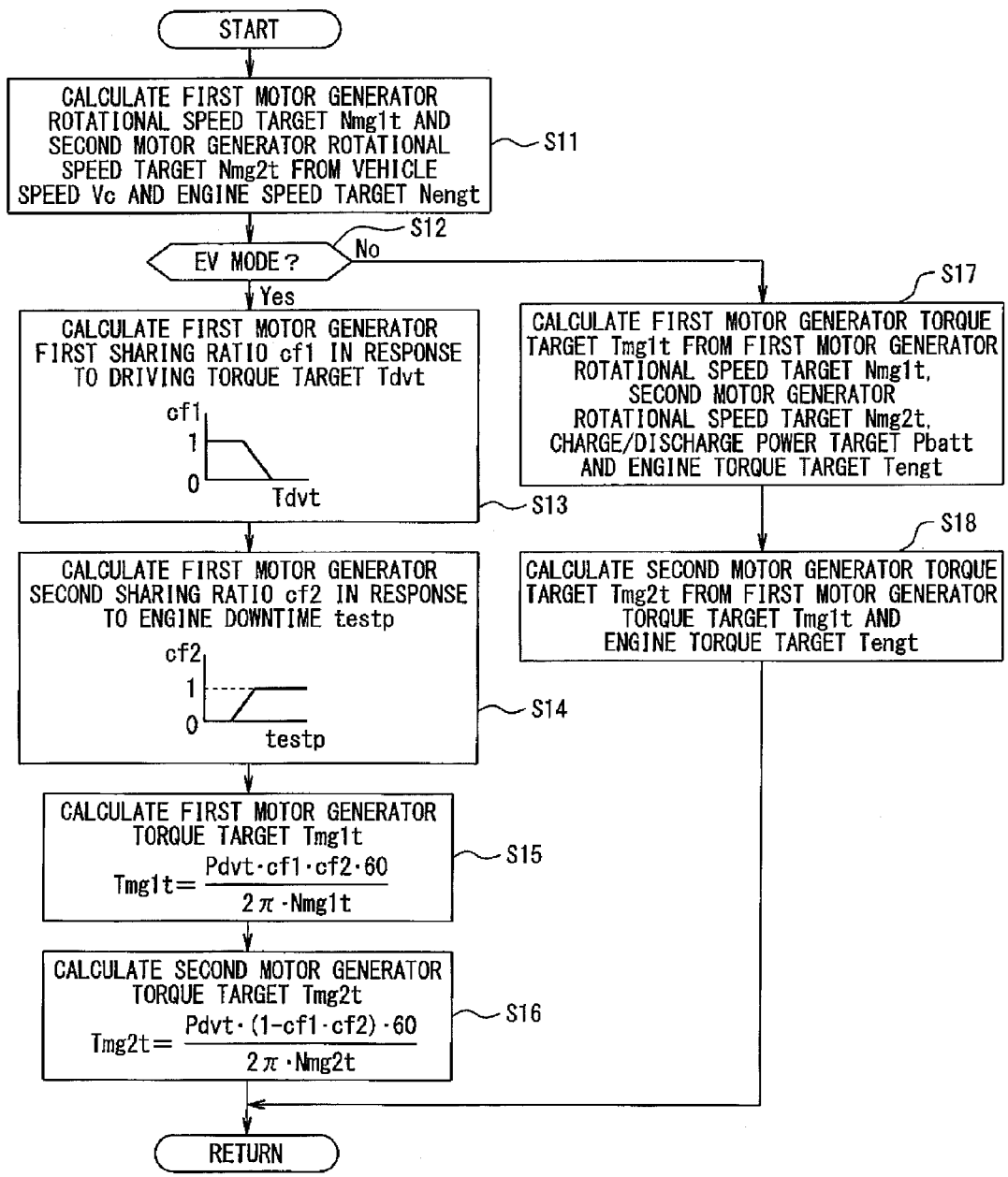
FIG. 13 is a flow chart representing routine performed by the drive-control controller shown in FIG. 1.

Referring to the flow chart shown in FIG. 13, a routine in said drive-control controller 32, which constitutes said motor generator control function 42, is described. This routine may be executed immediately after execution of the routine shown in FIG. 10, for example, in accordance with a processing strategy such as interrupt-driven using a timer to generate periodic interrupts, one upon elapse of a predetermined sampling time (for example, 10 msec.); and it is initiated with calculating at step S11 a first motor-generator speed target Nmg1t and a second motor-generator speed target Nmg2t from the vehicle speed Vc and the engine speed target Nengt. For this calculation, the following formulas (1') and (2'), which are derived from the before-mentioned formulas (1) and (2), respectively, are used. As described before, the output rotational speed Nout that is used in the formulas is derived from the vehicle speed Vc, the final reduction ratio and the reduction ratio of output gearing 31.

$$Nmg1t=(Nengt-Nout)\times k1+Nengt \quad (1')$$

$$Nmg2t=(Nout-Nengt)\times k2+Nout \quad (2')$$

Next, the routine proceeds to step S12 at which it is determined whether or not the vehicle operates in a drive mode where only one or both of first motor generator 4 and second motor generator 5 drive the vehicle (indicated at "EV mode" in the figure, hereinafter called "motor generator drive mode"); and the routine proceeds to step S13 if the vehicle operates in motor-generator drive mode or otherwise the routine proceeds to step S17. Drive mode in which only one or both of first motor generator 4 and second motor generator 5 are activated, i.e. motor-generator drive mode, is established when engine power target Pengt is 0, for example, when battery 21 is almost fully charged, so that temporary charge/discharge power Pcdbt calculated based on battery state of charge SOC is greater than or equal to driving power target Pdvt or when, with accelerator pedal released, the vehicle creeps or coasts or decelerates unless battery 21 is almost fully charged.

Figure 14:
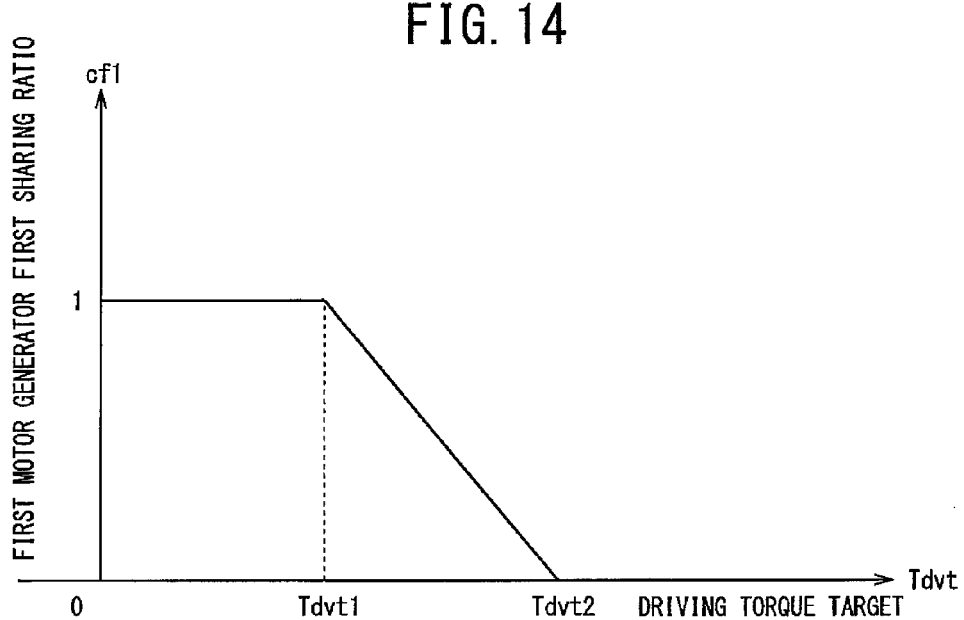
FIG. 14 is a control map used in the routine shown in FIG. 13.

At step S13, a first motor generator first sharing ratio cf1 corresponding to the driving torque target Tdvt is calculated in accordance with the control map shown in FIG. 14, for example, and then the routine proceeds to step S14. According to the control map shown in FIG. 14, the first motor generator first sharing ratio cf1 remains 1 when the driving torque target Tdvt is less than or equal to a first predetermined driving torque target value Tdvt1, the first motor generator first sharing ratio cf1 remains 0 when the driving torque target Tdvt is greater than or equal to a second predetermined driving torque target value Tdvt2, and the first motor generator first sharing ratio cf1 decreases linearly as the driving torque target Tdvt increases when the driving torque target Tdvt falls between the first predetermined driving torque target value Tdvt1 and the second predetermined driving torque target value Tdvt2. Therefore, this step S13 constitutes the motor generator first sharing ratio setting function. The range where the driving torque target Tdvt is less than or equal to the first predetermined driving torque target value Tdvt1 is a range where vehicle resonance caused by so-called cogging torque from the motor generators is likely to take place.

Figure 15:
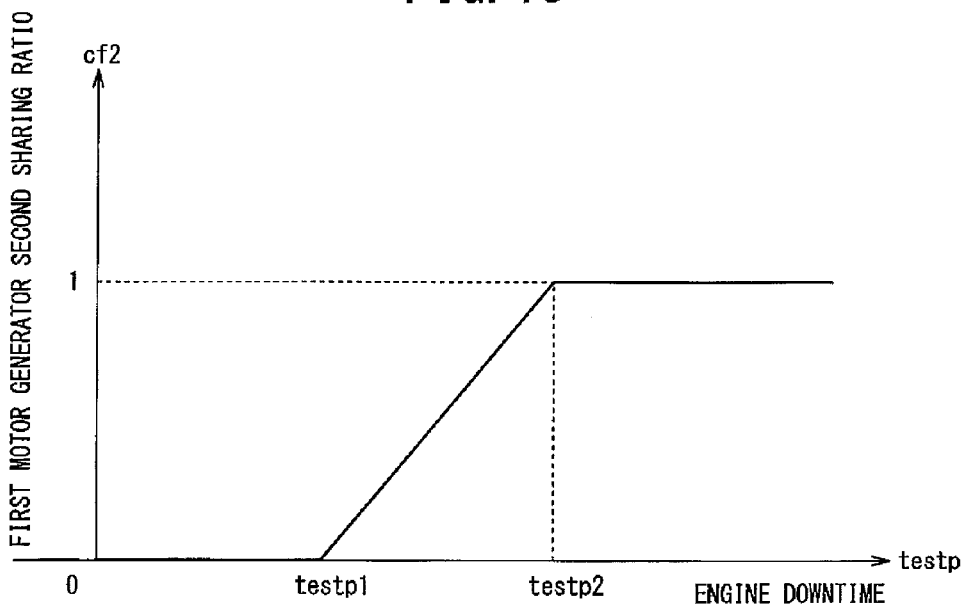
FIG. 15 is a control map used in the routine shown in FIG. 13.

At step S14, a first motor generator second sharing ratio cf2 corresponding to the engine downtime testp is calculated in accordance with the control map shown in FIG. 15, for example, and then the routine proceeds to step S15. The engine downtime testp is the length of time elapsed from a shift initiated by halting the engine 2 to a drive mode where only one or both of the first motor generator 4 and second motor generator 5 are used to drive the vehicle. According to the control map shown in FIG. 15, the first motor generator second sharing ratio cf2 remains 0 when the engine downtime testp is less than or equal to a first predetermined engine downtime value testp1, the first motor generator second sharing ratio cf2 remains 1 when the engine downtime testp is greater than or equal to a second predetermined engine downtime value testp2, and the first motor generator second sharing ratio cf2 increases linearly as the engine downtime testp increases when the engine downtime testp falls between the first predetermined engine downtime value testp1 and the second predetermined engine downtime value testp2. Therefore, this step S14 constitutes the motor generator second sharing ratio setting function.

At step S15, first motor generator torque target Tmg1t is calculated, in accordance with the following formula (5), based on driving power target Pdvt, first motor generator first sharing ratio cf1 and first motor generator second sharing ratio cf2 and first motor generator rotational speed target Nmg1t, and the routine proceeds to step S16.

$$Tmg1t=(Pdvt \times cf1 \times cf2 \times 60)/(2\pi \times Nmg1t) \quad (5).$$

An step S16, second motor generator torque target Tmg2t is calculated, in accordance with the following formula (6), based on driving power target Pdvt, first motor generator first sharing ratio cf1, first motor generator second sharing ratio cf2 and second motor generator rotational speed target Nmg2t, and the routine returns to the main program.

$$Tmg2t=(Pdvt \times (1-cf1 \times cf2) \times 60)/(2\pi \times Nmg2t) \quad (6).$$

On the other hand, at step S17, first motor generator torque target Tmg1t is calculated, in accordance with the following equation (7), based on first motor generator rotational speed target Nmg1t, second motor generator rotational speed target Nmg2t, charge/discharge power target Pbatt and engine torque target Tengt, and the routine proceeds to step S18. The following formula (7) is derived from modifying the simultaneous formulas (3) and (4).

$$Tmg1t=(Pbatt \times 60/2\pi - Nmg2t \times Tengt/k2)/(Nmg1t+Nmg2t \times (1+k1)/k2) \quad (7).$$

At step S18, second motor generator torque target Tmg2t is calculated, in accordance with the following equation (8), based on first motor generator torque target Tmg1t and engine torque target Tengt, and the routine returns to the main program. The following formula (8) is derived from beforementioned formula (3).

$$Tmg2t=(Tengt+(1+k1) \times Tmg1t)/k2 \quad (8).$$

According to the routine shown in FIG. 10, driving torque target Tdvt, which is variable reflecting operating conditions of the vehicle and responsive to the driver's power demand, is set based on vehicle speed Vc and accelerator pedal position Acc, and driving power target Pdvt is calculated by multiplying the driving torque target Tdvt by vehicle speed Vc. On the other hand, temporary charge/discharge power Pcdbt, which is variable responsive to the state of charge SOC of battery 21, is set; engine power target Pengt is calculated by subtracting the temporary charge/discharge power Pcdbt from driving power target Pdvt; and engine speed target Nengt and engine torque target Tengt are calculated by retrieval of map shown in FIG. 9 using the engine power target Pengt, which has been subject to upper limit cut-off process. Then, charge/discharge power target Pbatt is calculated by subtracting the engine power target Pengt, which has been subject to upper limit cut-off process, from driving power target Pdvt. Thus, it is made possible to achieve engine operating conditions with good overall efficiency of vehicle by achieving engine speed target Nengt and engine torque target Tengt caused due to the fact that engine control function 41 controls conditions of intake air adjusted by mass air flow adjustment unit 10, conditions of admission of fuel adjusted by fuel admission system 11 and conditions of igniting fuel adjusted by ignition manager 12.

Since this is the state in which engine 2 is operating, the routine shown in FIG. 13 proceeds from step S11 to step S17 at which first motor generator rotational speed target Nmg1t and second motor generator rotational speed target Nmg2t are set in response to vehicle speed Vc and engine speed target Nengt. Further, at step S18, first motor generator torque target Tmg1t and second motor generator torque Tmg2t are set such that they satisfy the torque balance expressed by the formula (3) and the electricity balance expressed by the formula (4). Consequently, it is made possible to achieve operating conditions of motor generators with good torque balance and electricity balance together with good overall efficiency of vehicle by causing first motor generator target Tmg1t and second motor generator torque target Tmg2t to take place by turning the first motor generator 4 at first motor generator rotational speed target Nmg1 and second motor generator 5 at second motor generator rotational speed target Nmg2 under the control of first inverter 19 and second inverter 20.

On the other hands, under operating conditions of the vehicle where engine 2 is out of operation, the vehicle is in motor generator drive mode, it is necessary to drive the vehicle by only one or both of first motor generator 4 and second motor generator 5. Under these conditions, engine power target Pengt is 0 and so one or both of first motor generator 4 and second motor generator 5 are required, as sources, for driving power target Pdvt. In this situation, first motor generator first sharing ratio cf1 is set in response to driving torque target Tdvt at step S13 of the routine shown in FIG. 13, and first motor generator second sharing ratio cf2 is set in response to engine downtime testp at step S14. Then, using these results, at steps S15 and S16, first motor generator torque target Tmg1t and second motor generator torque target Tmg2t are calculated and set.

Figure 16:
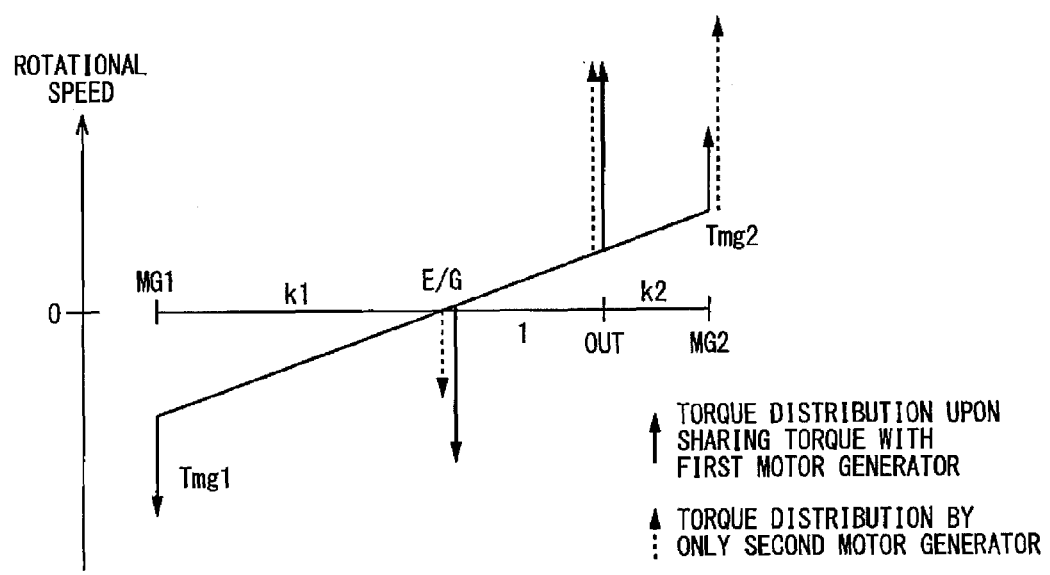
FIG. 16 is a collinear diagram for the power split and composition device in FIG. 1 to describe the operation of the routine shown in FIG. 13.
Figure 17A:
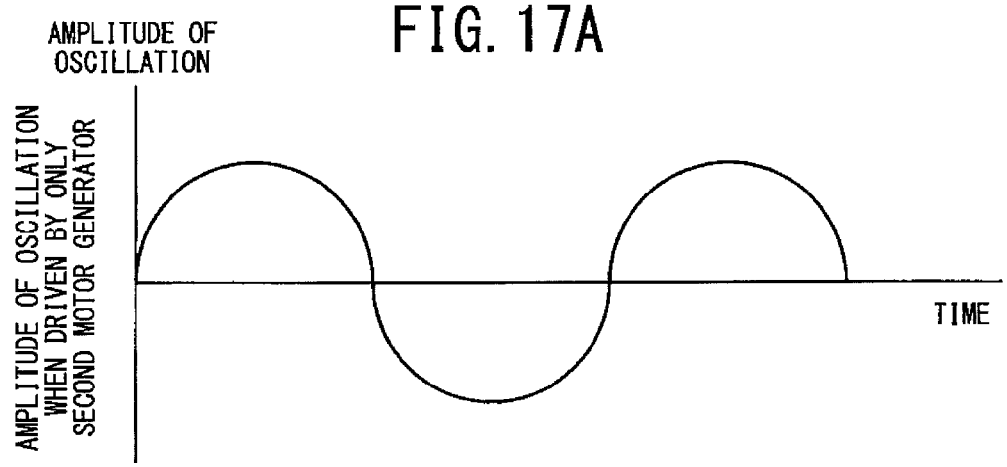
FIGS. 17A-17C are explanatory diagrams showing vibration components from first motor generator and second motor generator.
Figure 17B:
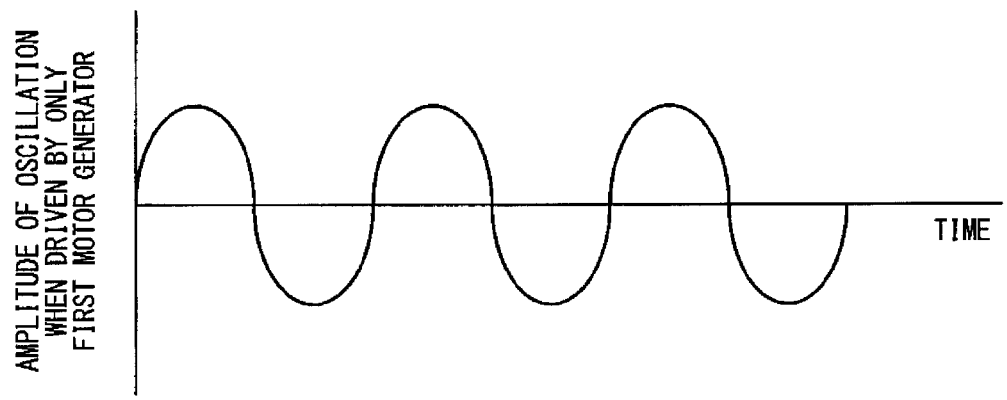
Figure 17C:
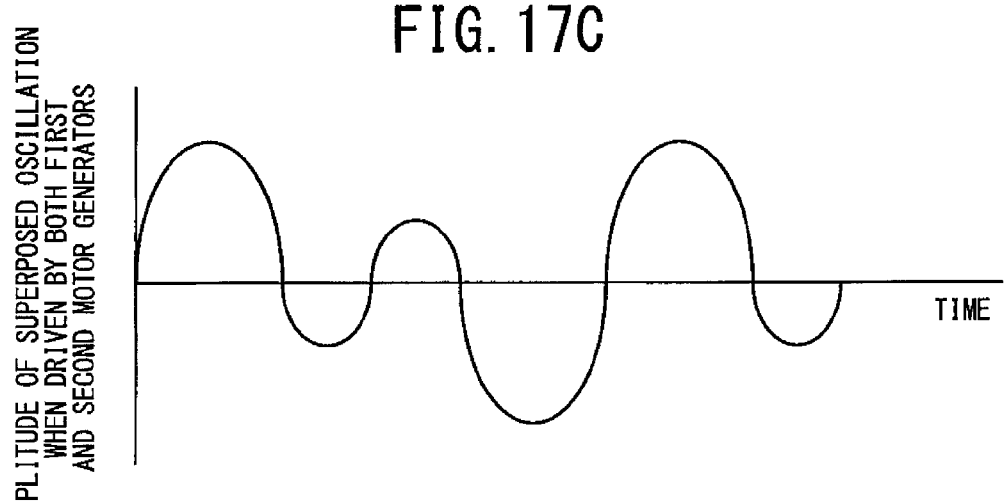

Under operating conditions at low speeds where engine 2 is out of operation, for example, it may be sufficient to cause only second motor generator 4 to generate second motor generator torque Tmg2 as indicated by broken lines shown in FIG. 16. However, vehicle can vibrate due to resonance with cogging torque of a motor especially at low speeds immediately before the vehicle comes to a standstill. As such resonance occurs when frequencies of oscillation due to cogging torque of a single motor are the same as the vehicle's resonant frequencies, if the vehicle has two motors, it may be sufficient to share the motor torque by turning the two motors concurrently. FIG. 17 shows components of oscillations, each resulting from converting cogging torque of one of motor generators to torque imparted to a driving shaft. FIG. 17(a) shows the amplitude of oscillation when only second motor generator 5 is operating, FIG. 17(b) shows the amplitude of oscillation when only first motor generator 4 is operating and FIG.

17(c) shows the amplitude of superposed oscillations when both of first and second motor generators 4 and 5 share the driving torque.

As is clear from the Figures, the cycle of oscillation when the driving torque when engine is out of operation is generated by only second motor generator 5 is different from the cycle of oscillation when the driving torque when engine is out of operation is generated by only first motor generator 4, and a waveform resulting from combining the cycle of oscillation when the driving torque is generated by only second motor generator 5 with the cycle of oscillation when the driving torque is generated by only first motor generator 4 is provided when first motor generator 4 and second motor generator 5 share the driving torque. Thus, sharing the driving torque with first motor generator 4 and second motor generator 5 makes it possible to restrain and prevent resonance of vehicle because the cycle of oscillation does not become single.

Figure 18:
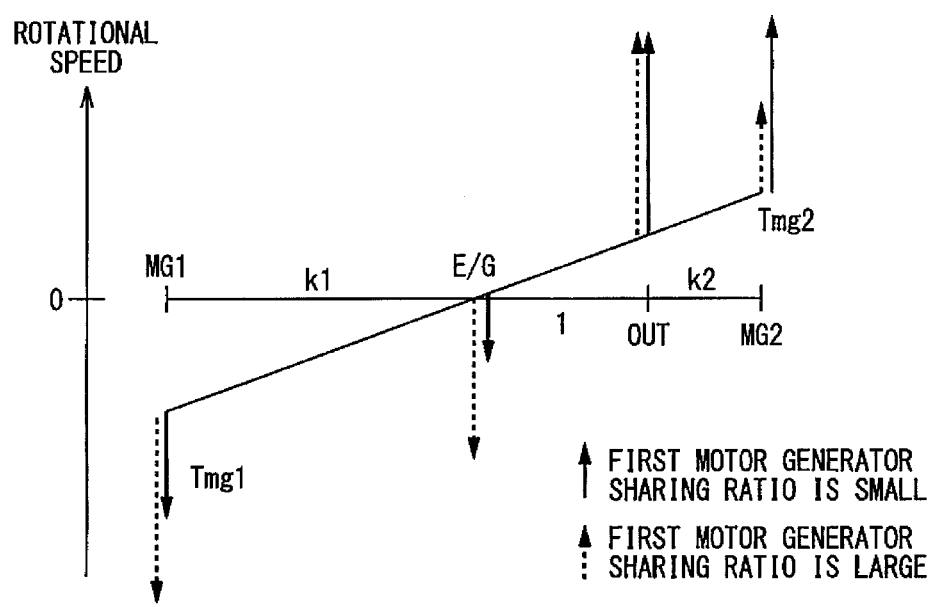
FIG. 18 is a collinear diagram for the power split and composition device in FIG. 1 to describe how the routine shown in FIG. 13 works.

However, on the other hand, if, as indicated by the solid lines in FIG. 16, the driving torque that originally is to be generated only by second motor generator 5 is shared with first motor generator 4 such that a part of the driving torque is generated by first motor generator 4, it is likely that torque applied to engine output shaft 3 of engine 2, i.e. torque to be received by one-way clutch 1, may increase and become in some cases too high. Therefore, in this embodiment, as described before, first motor generator first sharing ratio cf1 variable in response to driving torque target Tdvt and first motor generator second sharing ratio cf2 variable in response to engine downtime testp are set. Then, first motor generator torque target Tmg1t is calculated and set by multiplying driving power target Pdvt with these sharing ratios and then dividing it by first motor generator rotational speed target Nmg1t. Second motor generator torque target Tmg1t is calculated and set by multiplying the value given by subtracting the product of first motor generator first sharing ratio cf1 and first motor generator second sharing ratio cf2 from 1 and then dividing it by second motor generator rotational speed target Nmg2t. If, as indicated by the broken lines in FIG. 18, the sharing ratio for first motor generator 4 is high, torque applied to engine output shaft 3 of engine 2, i.e. torque to one-way clutch 1, becomes high, however, if, as indicated by the solid lines in FIG. 18, the sharing ratio for first motor generator 4 is low, as solid lines in FIG. 18 shows, torque applied to engine output shaft 3 of engine 2, i.e. torque to one-way clutch 1, may be reduced.

As mentioned before, since first motor generator first sharing ratio cf1 remains 0 in the range greater than or equal to driving torque target second predetermined value Tdvt2, which is set to the upper limit of torque range where resonance of vehicle caused due to cogging torque is likely to take place, only second motor generator 5 mainly produces driving torque target Tdvt when driving torque target Tdvt is greater than or equal to driving torque target second predetermined value Tdvt2, making it possible to restrain and prevent an increase in torque applied one-way clutch 1. On the other hand, when driving torque target Tdvt is between driving torque target first predetermined value Tdvt1 and driving torque target second predetermined value Tdvt2, first motor generator 4 and second motor generator 5 share driving torque target Tdvt, meaning that resonance of vehicle caused due to cogging torque of can be restrained and prevented by two motor generators operating concurrently and torque applied to one-way clutch 1 can be prevented from becoming too high by making first motor generator torque target Tmg1t become larger as driving torque target Tdvt becomes smaller. Since first motor generator first sharing ratio cf1 remains 1 in the range where driving torque target Tdvt is less than or equal to driving torque target first predetermined value Tdvt1, only first motor generator 4 mainly produces driving torque target Tdvt when driving torque target Tdvt is less than or equal to driving torque target first predetermined value Tdvt1, but torque applied to engine output shaft 3 of engine 2, i.e. torque applied to one-way clutch 1, is small sufficiently because resonance of vehicle caused due to cogging torque is least likely to take place in this range and driving torque target Tdvt itself is small sufficiently.

First motor generator second sharing ratio cf2 set in response to engine downtime testp remains 0 in the range where engine downtime testp is less than or equal to engine downtime first predetermined value testp1. This means that, upon shutdown of engine during deceleration, although originally torque distribution as indicated by the broken lines shown in FIG. 16 should have been provided, first motor generator torque Tmg1 responsive to first motor generator first sharing ratio cf1 would take place immediately when, referring to the control map shown in FIG. 14, driving torque target Tdvt is less than driving torque target second predetermined value Tdvt2, resulting in an increase in torque applied to one-way clutch 1 in a step-like manner. In order to restrain and prevent such rapid increase in torque applied to one-way clutch 1, first motor generator second sharing ratio cf2 remains 0 in the range where engine downtime tstp is less than or equal to engine downtime first predetermined value testp1, allowing first motor generator torque Tmg1 to gradually increase after engine downtime tstp exceeds the engine downtime first predetermined value testp1.

In a drive control for hybrid electric vehicle according to the embodiment, an engine 2, a first motor generator 4 and a second motor generator 5 are provided as power sources, one of the directions of revolution of the engine output shaft 3 of engine 2 is restricted by a one-way clutch (an engine revolution restricting device) 1. Further, four rotary elements of a power split and composition device, which is composed a first planetary set 8 and a second planetary set 9, are coupled to a drive shaft 7 connected to a traction wheel 6, the first motor generator 4, the second motor generator 5 and the engine 2, respectively. Further, a driving torque target Tdvt is set for the vehicle, and operations of the first and second motor generators 4 and 5 are controlled in response to the driving torque target Tdvt. A motor generator first sharing ratio cf1 is set in response to the driving torque target Tdvt for use in a motor generator drive mode, in which one of the first and second motor generators 4 and 5 is mainly put into operation, initiated by halting the engine 2. Under a predetermined operating condition, in which vehicle vibrations may take place, during driving in motor generator drive mode, both of the first and second motor generators 4 and 5 are put into operation by controlling operation of the other of the first and second motor generators, i.e. the first motor generator 4 in this case, in response to the motor generator first sharing ratio cf1. Accordingly, it is made possible to reduce torque from the other of the first and second motor generators, i.e. torque from the first motor generator 4, only by setting the motor generator sharing ratio cf1 in response to the magnitude of the driving torque target Tdvt. Thus this makes it possible to restrain and prevent the torque applied to the one-way clutch 1 from becoming excessively large when controlling operation of the first and second motor generators 4 and 5 in the motor generator drive mode.

The motor generator first sharing ratio cf1 is set such that when the driving torque target Tdvt is greater than or equal to a driving torque target second predetermined value Tdvt2, the motor generator first sharing ratio cf1 is zero, while, when the driving torque target Tdvt is less than the driving torque target second predetermined value Tdvt2, the motor generator first sharing ratio cf1 gets closer to one as the driving torque target Tdvt becomes smaller. A motor generator torque target is set for the other motor generator of the first and second motor generators 4 and 5, i.e. the first motor generator torque target Tmg1t, by multiplying a driving power target Pdvt, calculated from the driving torque target Tdvt, by the first motor generator first sharing ratio cf1. In addition, a motor generator torque target is set for the one motor generator of said first and second motor generators 4 and 5, i.e. the second motor generator torque target Tmg2t for the second motor generator 5, based on a driving power given by subtracting a driving power portion, derived from the first motor generator torque target Tmg1t, from the driving power target Pdvt. Therefore, it is made possible to reduce the motor generator torque target from the other of the first and second motor generators, i.e. the first motor generator torque target Tmg1t for the first motor generator 4, when the magnitude of the driving torque target Tdvt is large. Accordingly, this makes it possible to restrain and prevent the torque applied to the one-way clutch 1 from becoming excessively large when controlling operation of the first and second motor generators 4 and 5 in the motor generator drive mode.

A motor generator second sharing ratio cf2 is set in response to engine downtime testp caused due to halting the engine 2 to initiate motor generator drive mode. Further, a motor generator torque target for the other motor generator of the first and second motor generators 4 and 5, i.e. the first motor generator torque target Tmg1t for the first motor generator 4, is set by multiplying the driving power target Pdvt by the motor generator second sharing ratio cf2. Further, a motor generator torque target for the one motor generator of said first and second motor generators 4 and 5, i.e. the second motor generator torque target Tmg2t for the second motor generator 5, is set based on a driving power given by subtracting a driving power, derived from the first motor generator torque target Tmg1t, from the driving power target Pdvt. Therefore, it is made possible to reduce the motor generator torque target from the other of the first and second motor generators 4 and 5, i.e. the first motor generator torque target Tmg1t for the first motor generator 4, by setting the motor generator second sharing ratio cf2 in response to the length of the engine downtime testp. Further, this makes it possible to restrain and prevent the torque applied to the one-way clutch 1 from becoming excessively large when controlling operation of the first and second motor generators 4 and 5 in the motor generator drive mode.

The motor generator second sharing ratio cf2 is set such that when the engine downtime testp is less than or equal to an engine downtime first predetermined value testp1, the motor generator second sharing ratio cf2 is zero, while, when the engine downtime testp is greater than the engine downtime first predetermined value testp1, the motor generator second sharing ratio cf2 gets closer to one as the engine downtime testp becomes greater. Therefore, it is made possible to reduce the motor generator torque target from the other of the first and second motor generators 4 and 5, i.e. the first motor generator torque target Tmg1t for the first motor generator 4, when the length of the engine downtime testp is short. Accordingly, this makes it possible to restrain and prevent the torque applied to the one-way clutch 1 from becoming excessively large when controlling operation of the first and second motor generators 4 and 5 in the motor generator drive mode.

The connecting configuration of four rotational elements (shafts) of power split and composition device is not limited to the one described above, various connecting forms are to be included, for example, as mentioned in said JP Patent No. 3852562 which the applicant previously proposed. The drive control apparatus for hybrid electric vehicle according to the present invention may achieve the same effect even on a hybrid vehicle with such connecting configuration forms.

Configuration of drive control function of engine, first and second motor generators in other than motor generator drive mode is also not limited to the previously described one, various kinds of configurations of hybrid control function can be adopted. Even in such a hybrid vehicle, the drive control apparatus according to the present invention may achieve the equal function and effect in motor generator drive mode.

DESCRIPTION OF NOTATIONS

1 One-way clutch (engine revolution restricting device)
2 Engine
3 Engine output shaft
4 First motor generator
5 Second motor generator
6 Traction wheel
7 Drive shaft
8 First planetary gear set (power split and composition device)
9 Second planetary gear set (power split and composition device)
19 First inverter
20 Second inverter
21 Battery
32 Drive-control controller
37 Driving torque target setting function
38 Driving power target setting function
39 Charge/discharge power target setting function
40 Engine power setting function
41 Engine control function
42 Motor generator control function.

The invention claimed is:

1. A drive control apparatus for a hybrid electric vehicle, including an engine, a device for restricting the direction of revolution of an engine output shaft of said engine, a drive shaft connected to a traction wheel, a first motor generator, a second motor generator, and a power split and composition device with four rotary elements coupled to said first motor generator, second motor generator, drive shaft and engine, respectively, the drive control apparatus comprising:
a driving torque target setting arrangement configured to set a driving torque target; and
a motor generator control arrangement configured to control operation of the first motor generator and second motor generator in response to said driving torque target,
said motor generator control arrangement including:
a motor generator first sharing ratio setting arrangement configured to set a motor generator first sharing ratio in response to said driving torque target in motor generator drive mode in which, with said engine halted, one of said first and second motor generators is primarily used as a source of drive, and;
a motor generator drive mode control arrangement configured to put both of said first and second motor generators into operation by controlling operation of the other of said first and second motor generators in response to said motor generator first sharing ratio under a predetermined operating condition, in which vehicle vibrations may take place, during driving in said motor generator drive mode.

2. The drive control apparatus for a hybrid electric vehicle according to claim 1, wherein said motor generator first sharing ratio setting arrangement sets the motor generator first sharing ratio such that when said driving torque target is greater than or equal to a driving torque target second predetermined value, the motor generator first sharing ratio is zero, and wherein when said driving toque target is less than the driving torque target second predetermined value, the motor generator first sharing ratio gets closer to one as the driving torque target becomes smaller, and wherein said motor generator drive mode control arrangement sets a motor generator torque target for the other motor generator of said first and second motor generators by multiplying a driving power target, calculated from the driving torque target, by said motor generator first sharing ratio, and a motor generator torque target for the one motor generator of said first and second motor generators based on a driving power given by subtracting a driving power portion, derived from the motor generator torque target for the other, from said driving power target.

3. The drive control apparatus for a hybrid electric vehicle according to claim 2, wherein said motor generator control function includes a motor generator second sharing ratio setting function configured to set a motor generator second sharing ratio in response to engine downtime caused due to halting the engine to initiate motor generator drive mode, and wherein said motor generator drive mode control function sets:

a motor generator torque target for the other motor generator of said first and second motor generators by multiplying said driving power target by said motor generator second sharing ratio, and also a motor generator torque target for the one motor generator of said first and second motor generators based on a driving power given by subtracting a driving power, derived from the motor generator torque target for the other, from said driving power target.

4. The drive control apparatus for a hybrid vehicle as recited in claim 3, wherein said motor generator second sharing ratio setting function sets the motor generator second sharing ratio such that when said engine downtime is less than or equal to an engine downtime first predetermined value, the motor generator second sharing ratio is zero, and wherein when said engine downtime is greater than the engine downtime second predetermined value, the motor generator second sharing ratio gets closer to one as the engine downtime becomes greater.

5. A hybrid electric vehicle comprising the drive control apparatus of claim 1.

6. A hybrid electric vehicle comprising the drive control apparatus of claim 4.

* * * * *